US011046611B2

(12) United States Patent
White et al.

(10) Patent No.: US 11,046,611 B2
(45) Date of Patent: Jun. 29, 2021

(54) CALCINING KETTLE, CALCINING SYSTEM, AND METHOD

(71) Applicant: Tru-Flow Systems, Inc., Magna, UT (US)

(72) Inventors: Jeffery C. White, Magna, UT (US); Brock D. White, Woods Cross, UT (US)

(73) Assignee: Tru-Flow Systems, Inc., Magna, UT (US)

( * ) Notice: Subject to any disclaimer, the term of this patent is extended or adjusted under 35 U.S.C. 154(b) by 0 days.

(21) Appl. No.: 16/378,091

(22) Filed: Apr. 8, 2019

(65) Prior Publication Data
US 2019/0308906 A1 Oct. 10, 2019

Related U.S. Application Data

(60) Provisional application No. 62/655,479, filed on Apr. 10, 2018.

(51) Int. Cl.
*B01J 6/00* (2006.01)
*B01J 19/18* (2006.01)
(Continued)

(52) U.S. Cl.
CPC ........... *C04B 11/0281* (2013.01); *B01J 6/002* (2013.01); *B01J 19/18* (2013.01); *F27B 1/12* (2013.01); *B01J 2219/00054* (2013.01)

(58) Field of Classification Search
CPC .. B01J 6/002; B01J 19/18; B01J 2219/00054; B01J 6/00; B01J 6/001; B01J 2219/00074; B01J 2219/00076; B01J 2219/00099; B01J 2219/0005; C04B 11/0281; C04B 11/024; F27B 1/12
See application file for complete search history.

(56) References Cited

U.S. PATENT DOCUMENTS

| 3,378,246 A | * | 4/1968 | Leding ................ C04B 11/0281 |
| | | | 423/172 |
| 3,901,645 A | | 8/1975 | Rowland |

(Continued)

FOREIGN PATENT DOCUMENTS

| EP | 0 277 208 B1 | * | 1/1992 | ............. C04B 11/02 |
| GB | 1 103 592 A | * | 2/1968 | ................ B01J 3/04 |

(Continued)

*Primary Examiner* — Anthony J Zimmer
(74) *Attorney, Agent, or Firm* — TraskBritt

(57) ABSTRACT

A calcining kettle includes an outer kettle shell, an inner kettle shell, an interior heat exchanger assembly defining at least one tortuous path inside a volume defined by the inner kettle shell, and an agitator within the inner kettle shell. The inner kettle shell is disposed within the outer kettle shell such that the inner kettle shell and the outer kettle shell together at least partially define a jacket adjacent the inner kettle shell. The inner kettle shell and the interior heat exchanger assembly at least partially define a processing volume. The agitator is configured to rotate at least one paddle to cause movement of a feedstock material within the processing volume. A heating device may be structured and adapted to circulate a heat transfer fluid in the at least one tortuous path and the jacket. Calcining methods are also disclosed.

22 Claims, 5 Drawing Sheets

(51) Int. Cl.
*C04B 11/028* (2006.01)
*F27B 1/12* (2006.01)

(56) References Cited

U.S. PATENT DOCUMENTS

| | | | |
|---|---|---|---|
| 4,113,836 A | | 9/1978 | O'Connor |
| 4,161,390 A | | 7/1979 | Page et al. |
| 4,469,648 A | * | 9/1984 | Ferraris ............... B01J 2/02 |
| | | | 264/9 |
| 4,835,369 A | | 5/1989 | Oslin |
| 4,915,623 A | * | 4/1990 | Ball ............... B01J 6/001 |
| | | | 432/139 |
| 5,169,444 A | | 12/1992 | Boos et al. |
| 5,743,728 A | | 4/1998 | Cloud et al. |
| 5,743,954 A | | 4/1998 | Rowland et al. |
| 5,927,968 A | * | 7/1999 | Rowland ............... B01J 6/001 |
| | | | 432/102 |
| 5,954,497 A | | 9/1999 | Cloud et al. |
| 6,012,447 A | | 1/2000 | Waxier et al. |
| 7,121,713 B2 | | 10/2006 | Bolind et al. |
| 7,175,426 B2 | | 2/2007 | Bolind et al. |
| 7,434,980 B2 | | 10/2008 | Bolind et al. |
| 2012/0006516 A1 | * | 1/2012 | Giroudiere ............... B01J 8/062 |
| | | | 165/133 |
| 2014/0113241 A1 | * | 4/2014 | Rooks, Jr. ............... C04B 11/0281 |
| | | | 432/98 |
| 2018/0031320 A1 | | 2/2018 | Shea |
| 2019/0322945 A1 | * | 10/2019 | Fumagalli ............... B01J 19/0013 |

FOREIGN PATENT DOCUMENTS

| | | | | | |
|---|---|---|---|---|---|
| GB | | 1 338 561 A | * | 11/1973 | ............ B01J 19/0006 |
| HU | | 207 670 B | * | 5/1993 | ............ B01J 19/0013 |
| WO | WO 2013 030 402 A2 | | * | 3/2013 | ............... D01D 1/09 |

* cited by examiner

CALCINING KETTLE, CALCINING SYSTEM, AND METHOD

CROSS-REFERENCE TO RELATED APPLICATION

This application claims the benefit of U.S. Provisional Patent Application Ser. No. 62/655,479, filed Apr. 10, 2018, and entitled "CALCINING SYSTEM, APPARATUS, AND METHOD," the disclosure of which application is hereby incorporated herein in its entirety by reference.

FIELD

Embodiments of the present disclosure relate generally to systems and methods for calcining material, such as gypsum.

BACKGROUND

Gypsum, or calcium sulfate dihydrate ($CaSO_4.2H_2O$), is a white or gray naturally occurring mineral. Raw gypsum ore is processed into a variety of products such as a portland cement additive, soil conditioner, industrial and building plasters, and gypsum wallboard. To produce plasters or wallboard, gypsum must be partially dehydrated or calcined to produce calcium sulfate hemihydrate ($CaSO_4.0.5H_2O$), commonly called stucco.

Calcining of gypsum typically involves heating ground gypsum to drive off water and form $CaSO_4.0.5H_2O$. The calcining is typically performed in a container conventionally referred to as a calcining kettle, in which ground gypsum can be held during the calcining. Calcination occurs at approximately 250° F. to 325° F. (120° C. to 162° C.), and 1 ton (0.908 megagrams (Mg)) of gypsum calcines to about 0.85 ton (0.77 Mg) of stucco.

In some current processes, gypsum is calcined by hot air from a heat source that may reach temperatures in excess of 2,600° F. (1,427° C.), which indirectly heats the feedstock in a kettle pot. In some other methods, this hot air percolates through the feedstock. Another method of calcining gypsum is by using lower-temperature air from a heat source to convey ground gypsum for a predetermined amount of time to form a calcined product.

BRIEF SUMMARY

In some embodiments, a calcining kettle includes an outer kettle shell, an inner kettle shell, an interior heat exchanger assembly defining at least one tortuous path inside a volume defined by the inner kettle shell, and an agitator within the inner kettle shell. The inner kettle shell is disposed within the outer kettle shell such that the inner kettle shell and the outer kettle shell together at least partially define a jacket adjacent the inner kettle shell. The inner kettle shell and the interior heat exchanger assembly at least partially define a processing volume. The agitator is configured to rotate at least one paddle to cause movement of a feedstock material within the processing volume.

A calcining system includes a calcining kettle and a heating device. The calcining kettle comprises an outer kettle shell, an inner kettle shell, an interior heat exchanger assembly defining at least one tortuous path inside a volume defined by the inner kettle shell, and an agitator within the inner kettle shell. The inner kettle shell is disposed within the outer kettle shell such that the inner kettle shell and the outer kettle shell together at least partially define a jacket adjacent the inner kettle shell. The inner kettle shell and the interior heat exchanger assembly at least partially define a processing volume. The agitator is configured to rotate at least one paddle to cause movement of a feedstock material within the processing volume. The heating device is structured and adapted to circulate a heat transfer fluid in at least one tortuous path and the jacket.

A method of calcining a material includes providing the feedstock material in the processing volume of the calcining kettle and providing a heat transfer fluid in at least one flow path selected from the group consisting of the at least one tortuous path and the jacket.

DETAILED DESCRIPTION

The illustrations presented herein are not actual views of any particular calciner or system but are merely idealized representations that are employed to describe example embodiments of the present disclosure. Additionally, elements common between figures may retain the same numerical designation.

The disclosure generally describes a calcining kettle, system, and method. The calcining kettle may include an outer kettle shell, an inner kettle shell, an interior heat exchanger assembly, and an agitator. Heat may be transferred to or from material within the inner kettle shell via the interior heat exchanger assembly and/or the inner kettle shell. Indirect heating and the use of multiple heat transfer flow paths may enable better control of process conditions, use of lower temperatures, increased options for process control, and higher material throughput.

Figure 1:
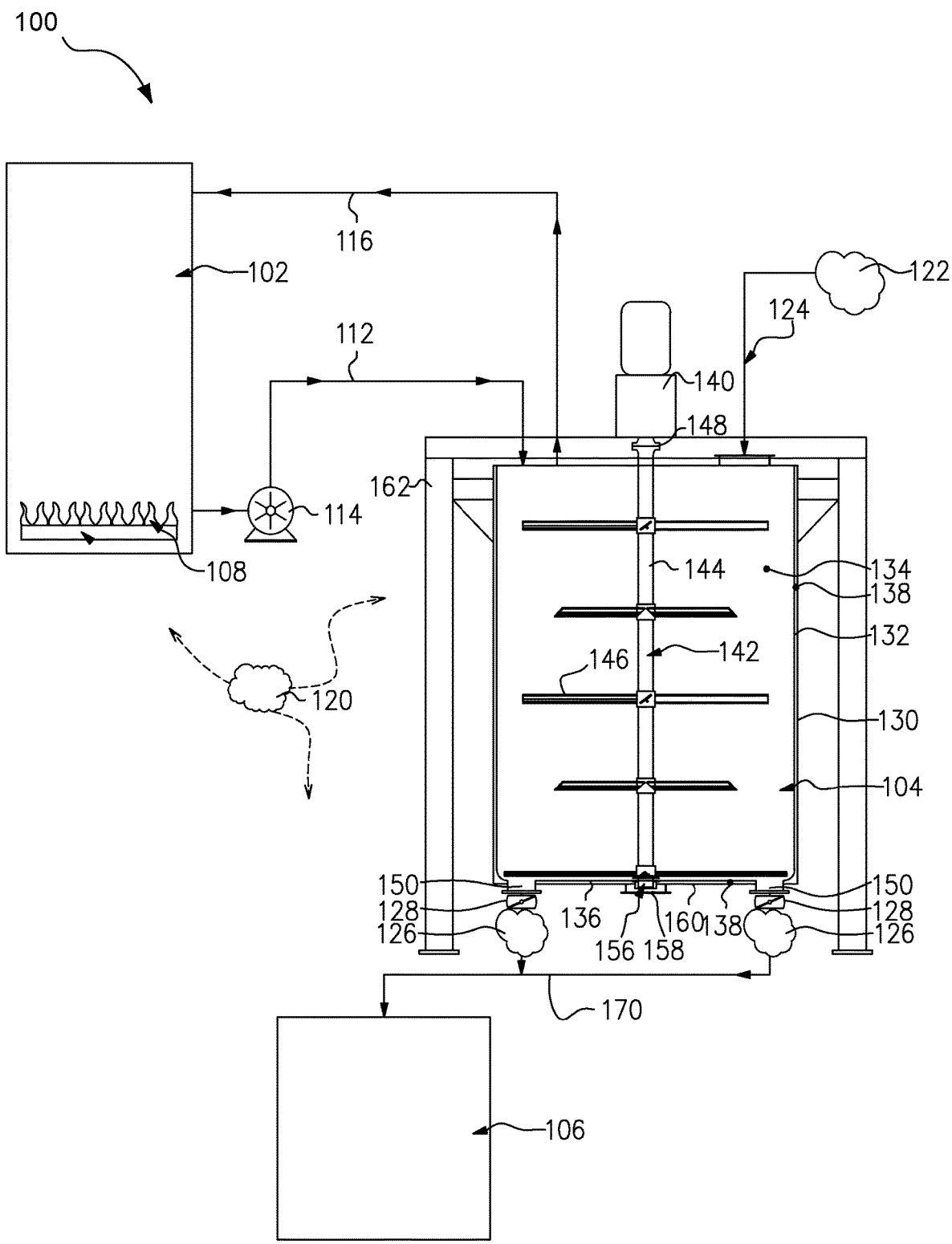
FIG. 1 illustrates a calcining system in accordance with one embodiment.

FIG. 1 is a simplified diagram illustrating a calcining system 100 having a heating device 102, a calcining kettle 104, and a discharge container 106. The calcining system 100 may also include various fluid connections, pumps, valves, piping, etc., connecting the components.

Figure 2:
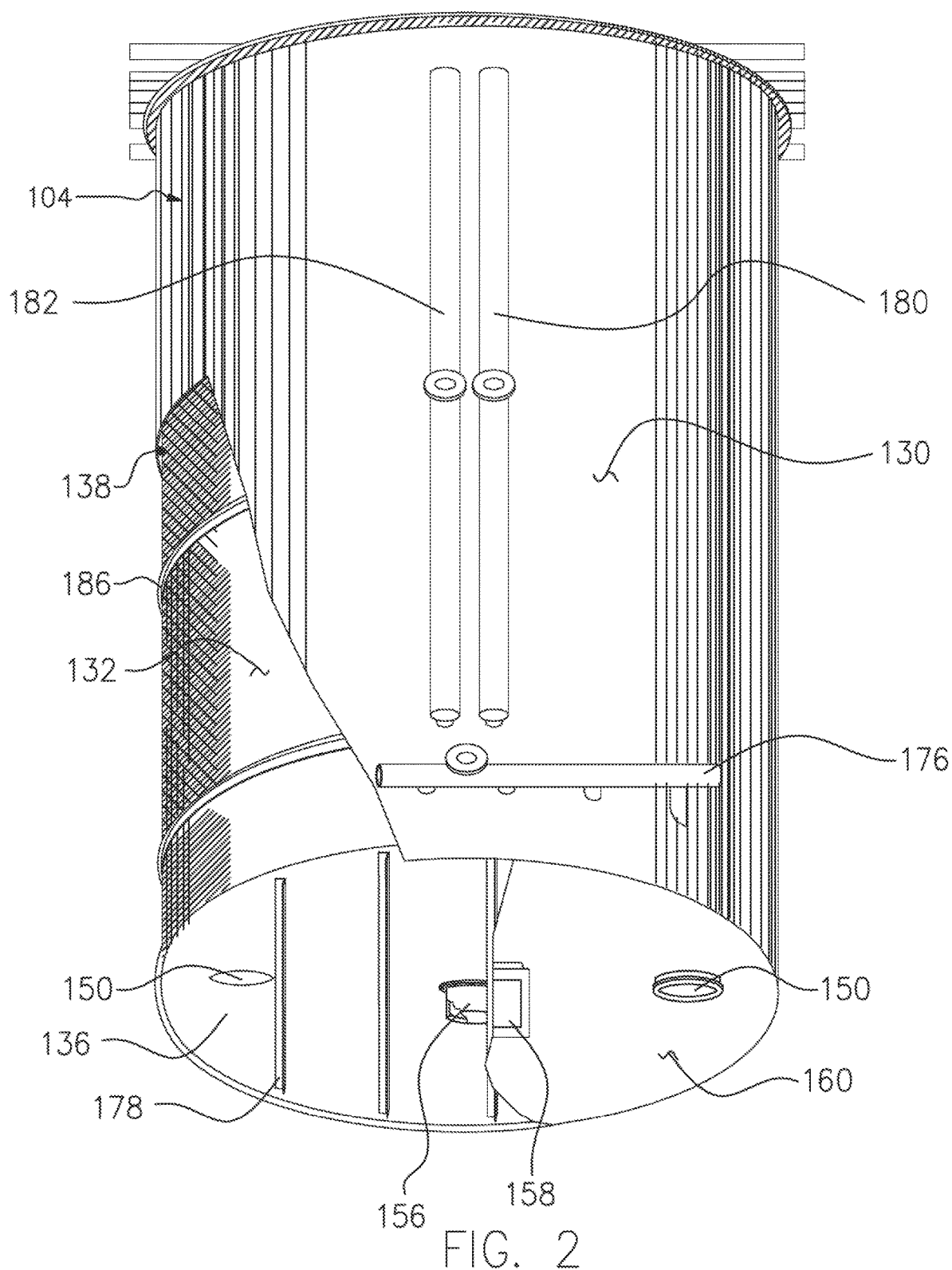
FIG. 2 is a simplified partially cutaway perspective view of a calcining kettle that may be used in accordance with the embodiment shown in FIG. 1.

FIG. 2 is a simplified partially cutaway perspective view of the kettle 104. The kettle 104 may be a generally cylindrical vessel or kettle having an outer kettle shell 130 and an inner kettle shell 132. Each of the outer kettle shell 130 and the inner kettle shell 132 may be cylindrical. The outer kettle shell 130 may have a base 160, and the inner kettle shell 132 may also have base 136. The bases 136, 160 may be generally planar and parallel to one another. The inner kettle shell 132 may be disposed within the outer kettle shell 130 such that a volume, hereinafter referred to as a jacket 138, at least partially surrounds the inner kettle shell 132. The jacket 138 may define a flow path through which a fluid can flow adjacent the inner kettle shell 132, such that heat can be transferred between the fluid and a material inside the inner kettle shell 132. The jacket 138 may define multiple distinct flow paths. For example, one flow path may be in the base of the kettle 104 (e.g., between the base 160 of the outer kettle shell 130 and the base 136 of the inner kettle shell 132), and another flow path may be on the lateral sides of the kettle 104. In some embodiments, the lateral sides of the jacket 138 may define two or more flow paths, such as to enable control of different parts of the kettle 104 at different temperatures.

Referring again to FIG. 1, the kettle 104 may include an agitator 142 within the inner kettle shell 132. The agitator 142 may include an agitator shaft 144 and one or more agitator paddles 146. A motor and gearbox 140 may be used to rotate the agitator shaft 144 via a mechanical coupling 148, and the agitator shaft 144 in turn rotates the agitator paddles 146. A frame structure 162 or another stationary object may support the motor and gearbox 140, such that the motor and gearbox 140 can provide vertical support to the agitator 142 via the mechanical coupling 148. Rotation of the agitator shaft 144 and agitator paddles 146 may cause movement of material inside the inner kettle shell 132. The agitator shaft 144 may extend through the base 160 and the base 136, and may connect to a bottom bearing 156, which may laterally support the agitator shaft 144. The bottom bearing 156 may be disposed in a housing 158 to protect the bottom bearing 156 and provide access for replacement or repair. The bottom bearing 156, the motor and gearbox 140, and other parts may be designed or adapted for use in high-dust environments.

Figure 3:
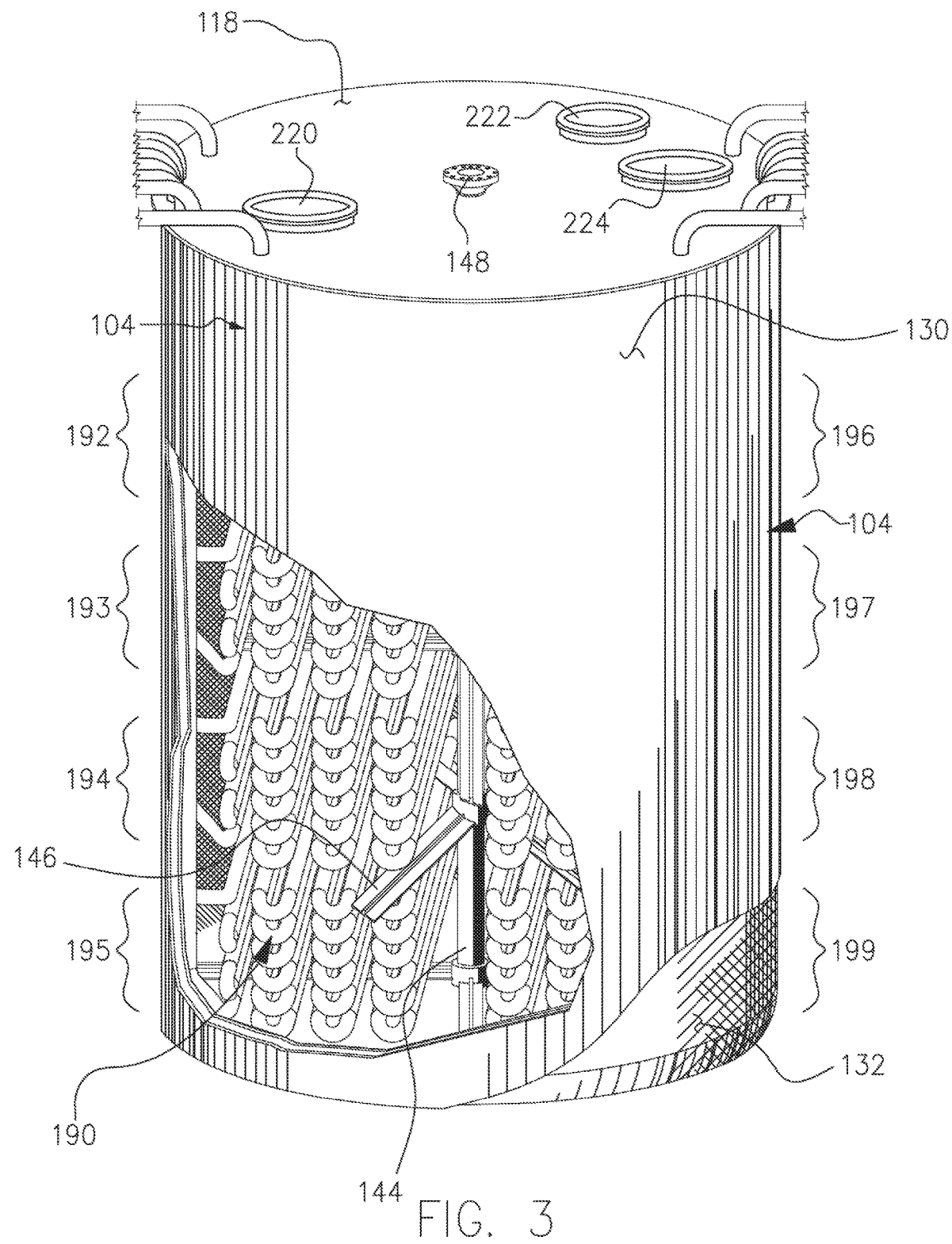
FIG. 3 is a simplified partially cutaway perspective cutaway view of the calcining kettle shown in FIG. 2.
Figure 4:
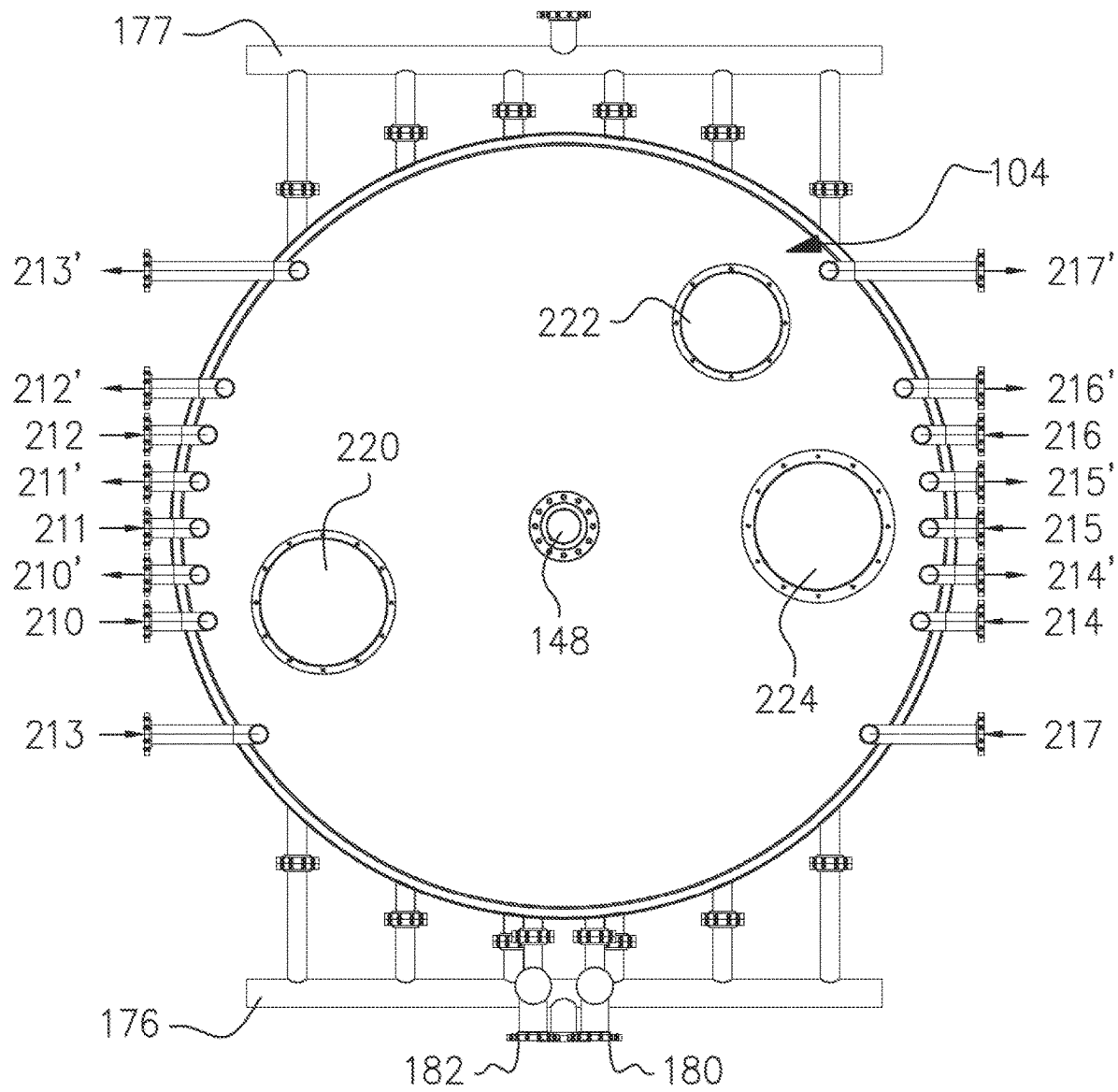
FIG. 4 is a top view of the calcining kettle shown in FIG. 2.
Figure 5:
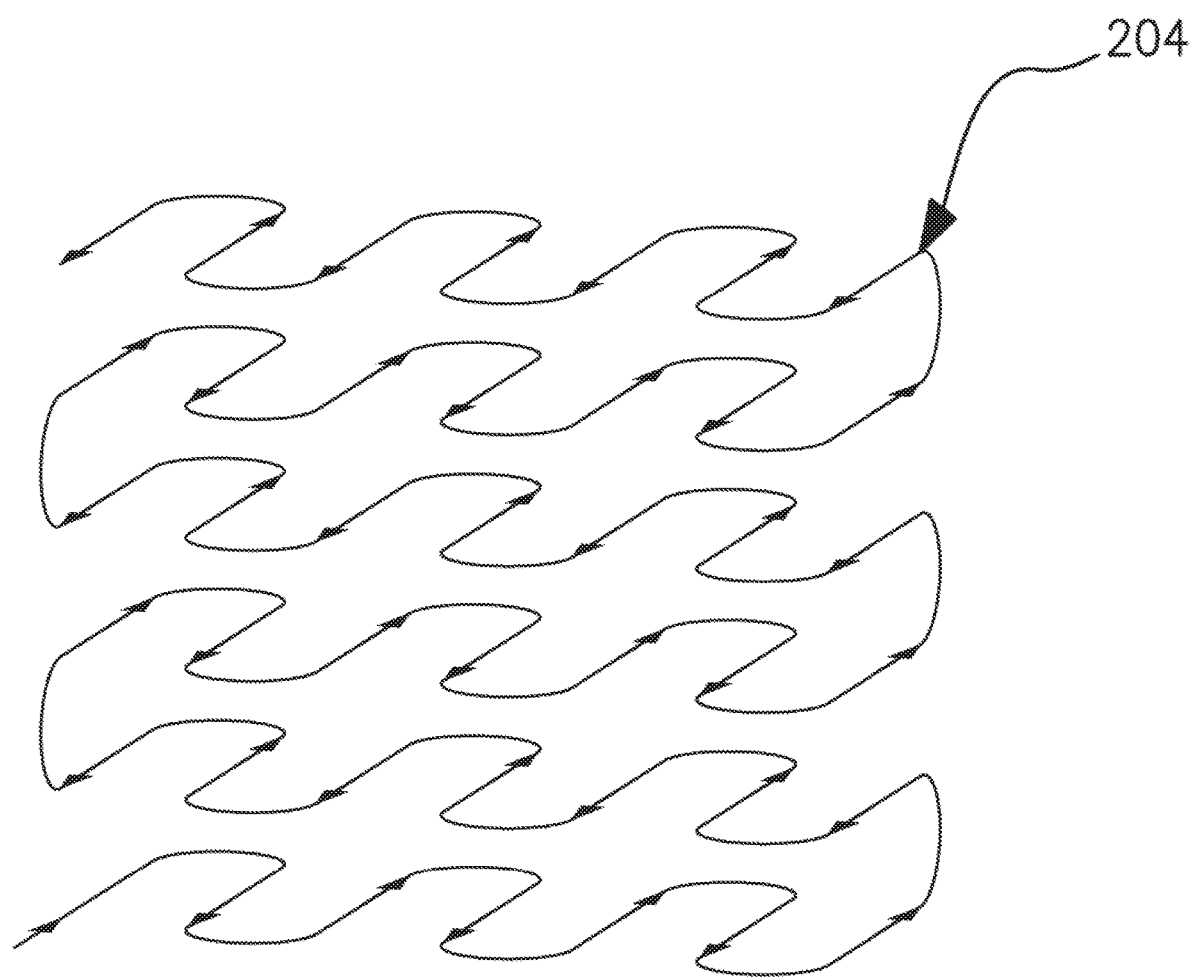
FIG. 5 is a simplified schematic view illustrating a flow path of an interior heat exchanger assembly that may be used in the calcining kettle shown in FIG. 2.

FIG. 3 is another simplified partially cutaway perspective view of the kettle 104, in which both the outer kettle shell 130 and the inner kettle shell 132 are partially cut away. FIG. 4 shows a simplified top view of the kettle 104. The kettle 104 may include an interior heat exchanger assembly 190 defining at least one tortuous path in the interior of the inner kettle shell 132. As used herein, the term "tortuous path" means and includes a fluid flow path having a plurality of curves interspersed with straight portions. FIG. 5 illustrates a possible tortuous path 204 that heat exchanger assembly 190 may define. The interior heat exchanger assembly 190 may include, for example, a plurality of sealed tubes in fluid connection with the heating device 102. Material within the inner kettle shell 132 (e.g., material to be processed in the kettle 104) may generally be sealed out of the interior of the interior heat exchanger assembly 190, such that the interior surface of the inner kettle shell 132 and the exterior surface of the interior heat exchanger assembly 190 together define a processing volume 134. A top cover 118 may be disposed over the top of the processing volume 134. The interior heat exchanger assembly 190 may be formed of a material having a high thermal conductivity, such as copper, aluminum, steel, stainless steel, etc. In some embodiments, the interior heat exchanger assembly 190 may be assembled using standard pipe and fittings.

In some embodiments, the interior heat exchanger assembly 190 may define two or more distinct tortuous paths through the inner kettle shell 132. For example, the interior heat exchanger assembly 190 may include sub-assemblies 192-199 that may be connected separately to heat transfer fluid supplies. Each sub-assembly 192-199 may include a plurality of sealed tubes arranged generally parallel to one another. The agitator paddles 146 may sweep circumferentially between adjacent sub-assemblies (i.e., one agitator paddle 146 may be below the sub-assemblies 194, 198 and above the sub-assemblies 195, 199; another agitator paddle 146 may be below the sub-assemblies 193, 197 and above the sub-assemblies 194, 198; and a third agitator paddle 146 may be below the sub-assemblies 192, 196 and above the sub-assemblies 193, 197). An agitator paddle 146 may also sweep circumferentially between the lower-most heat exchanger sub-assemblies 195, 199 and the kettle base 136. An agitator paddle 146 may also sweep above the upper-most heat exchanger sub-assemblies 192, 196 adjacent the material to be calcined.

Each sub-assembly 192-199 may be connected to separate inlets 210-217 and outlets 210'-217', which are depicted in FIG. 4. Each sub-assembly 192-199 and its corresponding inlets 210-217 and outlets 210'-217' may define independent flow paths for a heat transfer fluid (or different heat transfer fluids) in the kettle 104. The kettle 104 may also include one or more distribution manifolds 176, 180 structured and adapted to deliver the heat transfer fluid to the jacket 138 (see FIG. 2), and one or more collection manifolds 177, 182 to receive the heat transfer fluid from the jacket 138. Multiple flow paths for the heat transfer fluid in the interior heat exchanger assembly 190 and the jacket 138 may enable better control of the temperature profile in the processing volume 134 than a single flow path. The plurality of inlets 210-217, outlets 210'-217', and manifolds 176, 177, 180, 182 for heat transfer distribution and collection may also enable introduction of heat transfer fluid at different flow rates, which may enable better control of an overall temperature gradient relationship between the top and bottom of the processing volume 134. In some embodiments, an inlet 210-217 may be connected to an outlet 210'-217' to enable heat transfer fluid to flow through sub-assemblies 192-199 in series.

The kettle 104 may include one or more fluid diverters 178, 186 (FIG. 2), which may be structured and adapted to direct heat transfer fluid within the jacket 138. For example, the fluid diverter 186 may be arranged circumferentially around the inner kettle shell 132, and the fluid diverter 178 may define parallel channels under the base 136 of the inner kettle shell 132. The fluid diverters 178, 186 may prevent stagnation of the heat transfer fluid and may also provide structural support to the kettle 104 between the inner kettle shell 132 and the outer kettle shell 130.

Returning to FIG. 1, the heating device 102 may be a boiler, a furnace, or any other device structured and adapted to provide heat to a heat transfer fluid. In some embodiments, such as when the calcining system 100 is used to remove heat from a portion of the kettle 104, the heating device 102 may include a cooler instead of or in addition to a heater. In certain embodiments, the heating device 102 may include more than one device, such as to provide heat transfer fluids of various temperatures to different heat exchanger sub-assemblies 192-199 (FIG. 3) or portions of the jacket 138 of the kettle 104.

The heating device 102 may extract energy from a fuel source 108 and transfer that energy to the heat transfer fluid. The fuel source 108 may be, for example, a combustible liquid, gaseous, or solid fuel such as oil, natural gas, propane, wood, coal, bio-fuel, etc. In some embodiments, the heating device 102 may include an electric resistance heater, a heat pump, a solar collector, or other device. The heat transfer fluid may be any material formulated to flow through the interior heat exchanger assembly 190 and/or the jacket 138 and transfer thermal energy. For example, the heat transfer fluid may include pumpable fluids such as oil, kerosene, water, steam, salt, etc. In some embodiments, the heat transfer fluid may include an aromatic material, such as that sold under the trade name PARATHERM™ HR, by Paratherm Heat Transfer Fluids, a division of Lubrizol, of King of Prussia, Pa. In other embodiments, the heat transfer fluid may include a gas or mix of gases, such as a noble gas (e.g., argon) or air.

The calcining system 100 may include a pump 114 configured to transfer the heat transfer fluid from the heating device 102 to the kettle 104 through one or more supply lines 112 connected to the inlets 210-217 of the interior heat exchanger assembly 190. The heating device 102 may receive fluid through one or more return lines 116 connected to the outlets 210'-217' of the interior heat exchanger assembly 190. The supply lines 112 and return lines 116 may also be connected to the manifolds 176, 177, 180, 182 connected to the jacket 138.

Referring to FIG. 4, the kettle 104 may include a feed port 224 through which a feedstock material 122 (FIG. 1) may be introduced to the kettle 104. The kettle 104 may also include a vapor outlet port 220 and a dust return port 222. The feedstock feed port 224, the vapor outlet port 220, and the dust return port 222 may be structured and configured to cooperate with process and material-handling equipment. Such ports may provide for material feed, dust control, and access into the kettle 104.

The feedstock material 122 may be transferred to the kettle 104 using conveyance equipment 124 (e.g., screw conveyors, pneumatic conveying lines, conveyor belts, etc.) to regulate the flow of the feedstock material 122 into the processing volume 134. The feedstock material 122 may be heated inside the kettle 104 by the heat transfer fluid circulating through the jacket 138 and/or the interior heat exchanger assembly 190. Processed material 126 (e.g., feedstock material 122 that has been heated) may be removed from the kettle 104 through one or more outlet ports 150. In some embodiments, the outlet ports 150 may be located at the base 136, 160 of the kettle 104, such that extraction of the processed material 126 may be facilitated by gravity. A discharge control device 128 (e.g., a valve) may regulate the discharge rate of the processed material 126 from the kettle 104. Conveyance equipment 170 (e.g., screw conveyors, pneumatic conveying lines, conveyor belts, etc.) may direct the processed material 126 from the kettle 104 to the discharge container 106.

The discharge container 106 may be structured and adapted to receive the processed material 126 from the kettle 104 via the conveyance equipment 170. In some embodiments, the discharge container 106 may be located directly below the kettle 104, such that no conveyance equipment 170 is necessary.

The calcining system 100 may include a control system 120 structured and adapted to monitor and/or instruct operation of various valves, motors, pumps (e.g., the pump 114), etc., that are part of the calcining system 100 or that operate in conjunction with the calcining system 100 to provide process control. The control system 120 may help ensure that heat is applied to the feedstock material 122 in the proper amount and in the proper place as the feedstock material 122 flows through the kettle 104. The control system 120 may include a programmable logic controller (PLC), a human operator monitoring various displays of operational conditions, valve positions, and motor and pump parameters, etc.

In some embodiments, the kettle 104 may be supported or suspended by the frame structure 162. For example, the frame structure 162 may include a wide flange beam superstructure. The frame structure 162 may be formed of steel, aluminum, or any other selected material or combination of materials.

The kettle 104 may be designed to have a relatively higher ratio of heat transfer surface area to processing volume 134 than conventional calcining vessels. For simplicity, this ratio may be defined herein as a calcination transfer area ratio:

$$\text{Calcination transfer area ratio} = \frac{\text{Heat transfer surface area}}{\text{Processing volume}}.$$

The calcination transfer area ratio has dimensions of length$^{-1}$, such as ft$^{-1}$ or m$^{-1}$. If the interior of the kettle 104 is a right circular cylinder, the processing volume 134 may be defined as the area of base 136 times the height of the inner kettle shell 132 minus the volume of the agitator 142 and the interior heat exchanger assembly 190.

A conventional calcining vessel, without the agitator 142 and the interior heat exchanger assembly 190 therein, could have the same internal processing volume as the kettle 104 even if the exterior dimensions of the conventional calcining vessel are relatively smaller (e.g., the vessel could be shorter and/or of a smaller diameter).

The kettle 104, if it has the same processing volume as the conventional calcining vessel, will have a larger diameter, a larger height, or both, to account for the volume of the agitator 142 and the interior heat exchanger assembly 190. Therefore, the heat transfer surface area of the base 136 and sidewall of the inner kettle shell 132 will be larger than the heat transfer surface area of the conventional calcining vessel. Furthermore, the surface area of the interior heat exchanger assembly 190 adds to the total heat transfer surface area of the kettle 104. In some embodiments, the calcination transfer area ratio of the kettle 104 may be at least 1.4 ft$^{-1}$, at least 1.7 ft$^{-1}$, or even at least 2.0 ft$^{-1}$.

The greater calcination transfer area ratio of the kettle 104 as compared to a conventional calcining vessel may increase the rate at which heat is transferred to the feedstock material 122, and may decrease the temperature differential required to process the feedstock material 122. This may enable the calcining system 100 to produce more consistent processed material 126. For example, the processed material 126 may have a substantially uniform composition because substantially all of the processed material 126 may have been subjected to the same temperatures for the same amount of time.

The agitator 142 likewise may promote the formation of consistent processed material 126 because the agitator 142 may assist in keeping the feedstock material 122 in motion adjacent the heat transfer surfaces. Constant agitation may prevent stagnation of the feedstock material 122 next to heat transfer surfaces (which stagnation may tend to overheat some of the feedstock material 122 and cause excessive decomposition). The agitation may ensure that the feedstock material 122 continues to pass through the kettle 104 and generally remains mixed.

In some embodiments, the portion of the jacket 138 along the base 136 of the inner kettle shell 132 may be used separately for cooling the processed material 126 following the calcination process. A heat transfer fluid cooling device may be separately connectable to the jacket 138 and base 136, such as by valves. Thus, after the calcination process is complete, the heat transfer fluid passing through this portion of the jacket 138 may be cooler than the processed material 126.

Methods of calcining a material using the kettle 104 and calcining system 100 include providing the feedstock material 122 in the processing volume 134 and providing a heat transfer fluid in the interior heat exchanger assembly 190 and/or the jacket 138. The feedstock material 122 may be provided to the processing volume 134 at a temperature below about 50° C., and without substantial preheating or any preheating at all.

In some embodiments the heat transfer media circulated through the heat exchanger assembly 190 to heat the feedstock material 122 in the internal processing volume 134 may be maintained as low 350° F. (176° C.) or as maintained as high as 900° F. (482° C.). The time required for calcining may be inversely proportional to the temperature in the internal processing volume 134.

The process may be operated in continuous-flow mode, in which the feedstock material 122 is continuously transferred through the processing volume 134 at a throughput ratio of at least 0.90 hr$^{-1}$, meaning the volume of the material passing through the kettle 104 in one hour is 0.90 times the processing volume 134. In some embodiments, the throughput ratio may be at least about 1.10 hr$^{-1}$, at least about 1.30 hr$^{-1}$, or even at least about 1.50 hr$^{-1}$.

In some embodiments, the control system 120 may be programmed to maintain the heat transfer fluid at selected temperatures, agitate the feedstock material 122 during the calcining process, heat the feedstock material 122 by urging the flow of heat transfer fluid, and remove the processed material 126 when optimal temperature of the feedstock material 122 is achieved.

In batch-flow operations, a fixed amount of the feedstock material 122 may be provided into the processing volume 134 and heated until the entire mass is at a selected temperature. In a hybrid batch and continuous process, the feedstock material 122 may be added to the processing volume 134 and heated to a selected temperature, after which additional feedstock material 122 may be continuously added while the processed material 126 is continually removed. The continuous removal of the processed material 126 may proceed until the addition of feedstock material 122 ceases.

EXAMPLE

A calcining kettle, such as shown in FIG. 2 may be configured as a right circular cylinder having an inside diameter of 15 feet and an inside height of 20 feet. The walls of the apparatus are made of A36 carbon steel. The apparatus may include an interior heat exchanger assembly and an agitator, which together displace a volume of 111 ft$^3$. The internal heat exchanger pipes are 4-inch diameter carbon steel pipe. The apparatus may have a capacity of 90 tons of ground gypsum feedstock. The net volume of material inside the kettle at a conventional processing fill level (typically with 80% of the internal volume filled) is 3,011 ft$^3$. The internal heat exchanger assembly provides 4,178 ft$^2$ of heat exchange surface area. The total area of heat exchanging surface (including the interior heat exchanger assembly plus the walls and bottom of the apparatus) is 5,309 ft$^2$. The volume of heat exchanger cavities (i.e., the internal heat exchanger assembly plus the walls and bottom) is 523 ft$^3$.

The apparatus has a ratio of heat exchange surface area to processing volume of 1.76 ft$^{-1}$, meaning that there is 1.76 square feet of heat transfer surface area for each cubic foot of material in the apparatus. The amount of energy required by the apparatus for calcination may be as low as 185,000 btu of heat per ton of material processed, and have a throughput of 100 tons of material per hour, corresponding to a throughput ratio of 1.1.

One exemplary use of the apparatus is in the process of calcining gypsum. The control system maintains the heat transfer fluid at a nominal operating temperature of 650° F. (343° C.) and uses this heat transfer fluid to heat the gypsum feedstock to a calcination temperature of 325° F. (163° C.). The flow rates of heated fluid are individually controlled to each internal heat transfer section by the use of pumps and valves. The gypsum feedstock can be processed by either a continuous process or a batch process.

Other feedstocks that calcine at low temperatures (e.g., 850° F. (454° C.) and below) could also be processed in the same method. The particle size of the ground gypsum feedstock may be determined by the desired final product, and may be, for example, in the range of 50 mesh to 200 mesh.

Calcined gypsum formed in the apparatus may be substantially free of anhydrous calcium sulfate (deadburn), which is insoluble and typically formed in conventional processes when a portion of the feed material gets so hot that all the water is driven off. The apparatus may be operated with a relatively lower temperature differential between the heat transfer fluid and the feedstock, as compared to conventional processes, further limiting the formation anhydrous calcium sulfate.

Additional non limiting example embodiments of the disclosure are described below.

Embodiment 1: A calcining kettle comprising an outer kettle shell, an inner kettle shell, an interior heat exchanger assembly defining at least one tortuous path inside a volume defined by the inner kettle shell, and an agitator within the inner kettle shell. The inner kettle shell is disposed within the outer kettle shell such that the inner kettle shell and the outer kettle shell together at least partially define a jacket adjacent the inner kettle shell. The inner kettle shell and the interior heat exchanger assembly at least partially define a processing volume. The agitator is configured to rotate at least one paddle to cause movement of a feedstock material within the processing volume.

Embodiment 2: The calcining kettle of Embodiment 1, wherein a ratio of a sum of an outer surface area of the interior heat exchanger assembly and an inner surface area of the inner kettle shell divided by a volume of the processing volume is at least 1.4 ft$^{-1}$.

Embodiment 3: The calcining kettle of Embodiment 2, wherein the ratio of the sum of the outer surface area of the interior heat exchanger assembly and the inner surface area of the inner kettle shell divided by the volume of the processing volume is at least 1.7 ft$^{-1}$.

Embodiment 4: The calcining kettle of Embodiment 3, wherein the ratio of the sum of the outer surface area of the interior heat exchanger assembly and the inner surface area of the inner kettle shell divided by the volume of the processing volume is at least 2.0 ft$^{-1}$.

Embodiment 5: The calcining kettle of any of Embodiments 1 through 4, wherein the inner kettle shell and the outer kettle shell together define a generally cylindrical shape of the jacket.

Embodiment 6: The calcining kettle of any of Embodiments 1 through 5, wherein the inner kettle shell and the outer kettle shell each have a substantially planar circular base.

Embodiment 7: The calcining kettle of Embodiment 6, wherein the agitator comprises a kettle agitator shaft extending through the substantially planar circular base of the inner kettle shell.

Embodiment 8: The calcining kettle of Embodiment 7, further comprising a bottom bearing at least partially surrounding the kettle agitator shaft.

Embodiment 9: The calcining kettle of any of Embodiments 1 through 8, wherein the at least one tortuous path comprises a plurality of independent tortuous paths through the processing volume.

Embodiment 10: The calcining kettle of any of Embodiments 1 through 9, wherein the at least one tortuous path defines a first flow path and wherein the jacket defines at least a second flow path independent of the first flow path.

Embodiment 11: The calcining kettle of Embodiment 10, wherein the at least a second flow path comprises a flow path between a base of the inner kettle shell and a base of the outer kettle shell.

Embodiment 12: The calcining kettle of Embodiment 10, wherein the at least a second flow path comprises a flow path surrounding a lateral side of the inner kettle shell.

Embodiment 13: The calcining kettle of any of Embodiments 1 through 12, wherein the interior heat exchanger assembly comprises a plurality of pipes.

Embodiment 14: A calcining system, comprising a calcining kettle and a heating device. The kettle comprises an outer kettle shell, an inner kettle shell, an interior heat exchanger assembly defining at least one tortuous path inside a volume defined by the inner kettle shell, and an agitator within the inner kettle shell. The inner kettle shell is disposed within the outer kettle shell such that the inner kettle shell and the outer kettle shell together at least partially define a jacket adjacent the inner kettle shell. The inner kettle shell and the interior heat exchanger assembly at least partially define a processing volume. The agitator is configured to rotate at least one paddle to cause movement of a feedstock material within the processing volume. The heating device is structured and adapted to circulate a heat transfer fluid in the at least one tortuous path and the jacket.

Embodiment 15: The calcining system of Embodiment 14, wherein the heating device is structured and adapted to provide heat to a material in the processing volume only via the heat transfer fluid.

Embodiment 16: The calcining system of Embodiment 14 or Embodiment 15, further comprising a discharge container structured and adapted to receive material from the kettle.

Embodiment 17: A method of calcining a material comprising providing the material in the processing volume of the kettle of any of Embodiments 1 through 13 and providing a heat transfer fluid in at least one flow path selected from the group consisting of the at least one tortuous path and the jacket.

Embodiment 18: The method of Embodiment 17, wherein providing a heat transfer fluid in at least one flow path selected from the group consisting of the at least one tortuous path and the jacket comprises providing a first heat transfer fluid flow to the at least one tortuous path and providing a second heat transfer fluid flow to the jacket, wherein the first heat transfer fluid flow has a different flow rate than the second heat transfer fluid flow.

Embodiment 19: The method of Embodiment 17 or Embodiment 18, wherein providing a heat transfer fluid in at least one flow path selected from the group consisting of the at least one tortuous path and the jacket comprises providing the heat transfer fluid in at least one flow path at a temperature below a temperature of the material in the processing volume.

Embodiment 20: The method of any of Embodiments 17 through 19, further comprising continuously transferring the material through the processing volume at a throughput ratio of at least 0.90 hour$^{-1}$, the throughput ratio defined as a volumetric flow rate of the material divided by a volume of the processing volume.

Embodiment 21: The method of Embodiment 20, further comprising continuously transferring the material through the processing volume at a throughput ratio of at least 1.50 hour$^{-1}$.

Embodiment 22: The method of any of Embodiments 17 through 21, wherein providing the material in the processing volume of the calcining kettle of Embodiment 1 comprises providing the material in the processing volume at a temperature below about 50° C.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various vessel types and configurations.

What is claimed is:

1. A calcining kettle, comprising:
   an outer kettle shell;
   an inner kettle shell disposed within the outer kettle shell such that the inner kettle shell and the outer kettle shell together at least partially define a jacket adjacent the inner kettle shell, the jacket extending along about an entire length of the outer kettle shell;
   an interior heat exchanger assembly defining at least one tortuous path inside a volume defined by the inner kettle shell, the at least one tortuous path comprising a plurality of curves interspersed with straight portions, wherein the inner kettle shell and outer surface of the interior heat exchanger assembly at least partially define a processing volume, each of the interior heat exchanger assembly and the jacket configured to receive a heat transfer fluid for transferring heat to a material within the processing volume; and
   an agitator within the inner kettle shell, the agitator configured to rotate at least one paddle to cause movement of a feedstock material within the processing volume.

2. The calcining kettle of claim 1, wherein a ratio of a sum of an outer surface area of the interior heat exchanger assembly and an inner surface area of the inner kettle shell divided by a volume of the processing volume is at least 1.4 ft$^{-1}$.

3. The calcining kettle of claim 2, wherein the ratio of the sum of the outer surface area of the interior heat exchanger assembly and the inner surface area of the inner kettle shell divided by the volume of the processing volume is at least 1.7 ft$^{-1}$.

4. The calcining kettle of claim 3, wherein the ratio of the sum of the outer surface area of the interior heat exchanger assembly and the inner surface area of the inner kettle shell divided by the volume of the processing volume is at least 2.0 ft$^{-1}$.

5. The calcining kettle of claim 1, wherein the inner kettle shell and the outer kettle shell together define a cylindrical shape of the jacket.

6. The calcining kettle of claim 1, wherein the inner kettle shell and the outer kettle shell each have a planar circular base.

7. The calcining kettle of claim 6, wherein the agitator comprises a kettle agitator shaft extending through the planar circular base of the inner kettle shell, the at least one paddle configured to sweep circumferentially between adjacent sub-assemblies of the interior heat exchanger assembly, the adjacent sub-assemblies located at different heights along a length of the inner kettle.

8. The calcining kettle of claim 7, further comprising a bottom bearing at least partially surrounding the kettle agitator shaft.

9. The calcining kettle of claim 1, wherein the at least one tortuous path comprises a plurality of independent tortuous paths through the processing volume.

10. The calcining kettle of claim 1, wherein the at least one tortuous path defines a first flow path and wherein the jacket defines at least a second flow path independent of the first flow path.

11. The calcining kettle of claim 10, wherein the at least a second flow path comprises a flow path between a base of the inner kettle shell and a base of the outer kettle shell.

12. The calcining kettle of claim 10, wherein the at least a second flow path comprises a flow path surrounding a lateral side of the inner kettle shell.

13. The calcining kettle of claim 1, wherein the interior heat exchanger assembly comprises a plurality of pipes.

14. A calcining system, comprising:
a kettle comprising:
an outer kettle shell;
an inner kettle shell disposed within the outer kettle shell such that the inner kettle shell and the outer kettle shell together at least partially define a jacket adjacent the inner kettle shell;
an interior heat exchanger assembly defining at least one tortuous path inside a volume defined by the inner kettle shell, wherein the inner kettle shell and the interior heat exchanger assembly at least partially define a processing volume; and
an agitator within the inner kettle shell, the agitator configured to rotate at least one paddle to cause movement of a feedstock material within the processing volume, the at least one paddle extending between different sub-assemblies of the interior heat exchanger assembly; and
a heating device structured and adapted to circulate a heat transfer fluid in the at least one tortuous path and the jacket.

15. The calcining system of claim 14, wherein the heating device is structured and adapted to provide heat to a material in the processing volume only via the heat transfer fluid.

16. The calcining system of claim 14, further comprising a discharge container structured and adapted to receive material from the kettle.

17. A method of calcining a material, comprising:
providing a feedstock material in a processing volume of a calcining kettle, the calcining kettle comprising:
an outer kettle shell;
an inner kettle shell disposed within the outer kettle shell such that the inner kettle shell and the outer kettle shell together at least partially define a jacket adjacent the inner kettle shell, the jacket extending along about an entire length of the outer kettle shell;
an interior heat exchanger assembly defining at least one tortuous path inside a volume defined by the inner kettle shell, the at least one tortuous path comprising a plurality of curves interspersed with straight portions, wherein the inner kettle shell and the interior heat exchanger assembly at least partially define a processing volume; and
an agitator within the inner kettle shell, the agitator configured to rotate at least one paddle to cause movement of the feedstock material within the processing volume;
providing a heat transfer fluid in each of the at least one tortuous path and the jacket; and
rotating, within the inner kettle shell, an agitator comprising at least one paddle to move the feedstock material within the processing volume.

18. The method of claim 17, wherein providing a heat transfer fluid in each of the at least one tortuous path and the jacket comprises providing a first heat transfer fluid flow to the at least one tortuous path and providing a second heat transfer fluid flow to the jacket, wherein the first heat transfer fluid flow has a different flow rate than the second heat transfer fluid flow.

19. The method of claim 17, wherein providing a heat transfer fluid in each of the at least one tortuous path and the jacket comprises providing the heat transfer fluid in at least one flow path at a temperature below a temperature of the feedstock material in the processing volume.

20. The method of claim 17, further comprising continuously transferring the feedstock material through the processing volume at a throughput ratio of at least $0.90$ hour$^{-1}$, the throughput ratio defined as a volumetric flow rate of the material divided by a volume of the processing volume.

21. The method of claim 20, further comprising continuously transferring the feedstock material through the processing volume at a throughput ratio of at least $1.50$ hour$^{-1}$.

22. The method of claim 17, wherein providing a feedstock material in the processing volume of a calcining kettle comprises providing the feedstock material in the processing volume at a temperature below about 50° C.

* * * * *